(12) United States Patent
Amino et al.

(10) Patent No.: US 8,041,458 B2
(45) Date of Patent: Oct. 18, 2011

(54) ROBOT

(75) Inventors: Azusa Amino, Hitachinaka (JP); Junichi Tamamoto, Kasumigaura (JP); Ryosuke Nakamura, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 939 days.

(21) Appl. No.: 12/018,452

(22) Filed: Jan. 23, 2008

(65) Prior Publication Data

US 2008/0228320 A1    Sep. 18, 2008

(30) Foreign Application Priority Data

Mar. 15, 2007    (JP) .................................. 2007-065978

(51) Int. Cl.
*B25J 13/08* (2006.01)
(52) U.S. Cl. ..................... 700/259; 318/568.16
(58) Field of Classification Search .................. 700/259; 701/23–26; 180/167; 318/568.16–568.18
See application file for complete search history.

(56) References Cited

U.S. PATENT DOCUMENTS

| 7,173,391 B2 * | 2/2007 | Jones et al. ............... 318/568.12 |
| 7,783,386 B2 * | 8/2010 | Merte et al. ................... 700/255 |

FOREIGN PATENT DOCUMENTS

| JP | 2001-300876 | 10/2001 |
| JP | 2003-200366 | 7/2003 |
| JP | 2003-266364 | 9/2003 |
| JP | 2003-269579 | 9/2003 |
| JP | 2004-118469 | 4/2004 |
| JP | 2005-125457 | 5/2005 |
| JP | 2005-144606 | 6/2005 |
| JP | 2006-123102 | 5/2006 |
| JP | 2006-192562 | 7/2006 |

OTHER PUBLICATIONS

Kanehiro F. et al, Whole Body Locomotion Planning of Humanoid Robots based on a 3D Grip Map, Proceedings of the 2005 IEEE International Conference on Robotics and Automation, USA, IEEE, Apr. 18, 2005, Spain, Apr. 2005.

* cited by examiner

*Primary Examiner* — Dalena Tran
(74) *Attorney, Agent, or Firm* — Antonelli, Terry, Stout & Kraus, LLP.

(57) ABSTRACT

To provide a robot whose degree of freedom of design is not limited, and which has simple structure and further reduces load of an actuator of a neck part, the present invention provides a robot at least including a head part, a body part, and a neck link which connects the head part and the body part, wherein a surrounding object distance measurement means is provided adjacently to the neck link and in an upper portion of the body part between the head part and the body part, and a distance scanning field of the surrounding object distance measurement means is provided in parallel with a horizontal plane.

2 Claims, 5 Drawing Sheets

ROBOT

BACKGROUND OF THE INVENTION

1. Field of the Invention

The present invention relates particularly to a robot provided with a surrounding object distance measurement means to automatically perform desired operation or work while measuring the distance from a work object and an obstacle.

2. Description of Related Art

In many cases, a robot which operates in a coexistence environment with a human is provided with a surrounding object distance measurement means to avoid contact with a surrounding object, and thereby recognizes disposition conditions of the surrounding objects to set a moving route. As one example of the surrounding object distance measurement means, there is a laser scanning range sensor (SOKUIKI sensor) which determines the distance by measuring the time elapsed after a plane is scanned with laser light until the irradiated laser light hits against an object to be measured and the reflected light returns, and in order to widen a scan field, the laser scanning range sensor is often installed in a place around which there is no object which obstructs the scan field. In the prior art, in order to make the scan field of the laser scanning range sensor maximum, the sensor has been attached to the top of a head part, or a front part of a body such as an abdomen part and a chest part of the robot.

BRIEF SUMMARY OF THE INVENTION

However, in the case of the conventional structure in which a surrounding object distance measurement means, e.g. a laser scanning range sensor, is attached to the top of a head part of a robot as described above, since the head part on which the laser scanning range sensor is mounted is driven by an actuator, the load of the actuator for activating the head part becomes large.

Further, in the case of mounting the laser scanning range sensor on the head part, the head part is shaped so as not to obstruct a laser scanning plane, and therefore the degree of freedom of design has been remarkably restricted.

Furthermore, if the laser scanning range sensor is attached to a front part of a body or a chest part as disclosed in JP-A-2005-125457, shielding occurs with high frequency during operation by an arm, which makes it difficult to measure the distance from a work object or a surrounding object.

An object of the present invention is, in view of the above prior art as described above, to provide a robot having simple structure and further, reducing the load of an actuator of a neck part.

In order to solve the above problem, the present invention provides a robot characterized in that a surrounding object distance measurement means, e.g. a laser scanning range sensor, is provided adjacently to a neck link which connects a head part and a body part so that a scanning plane of the laser scanning range sensor is provided in parallel with a horizontal plane at an upper central portion of the body part and the center of a scan field is parallel with a roll axis.

According to the present invention, it is possible to achieve natural appearance, reduction in torque of a neck actuator, expression by various movements of a head part, and simplification of the neck structure, without narrowing a scan field of a surrounding object distance measurement means, e.g. a laser scanning range sensor.

Other objects, features and advantages of the invention will become apparent from the following description of the embodiments of the invention taken in conjunction with the accompanying drawings.

DETAILED DESCRIPTION OF THE INVENTION

Hereinafter, an embodiment of the present invention will be described with reference to the drawings.

Figure 1:
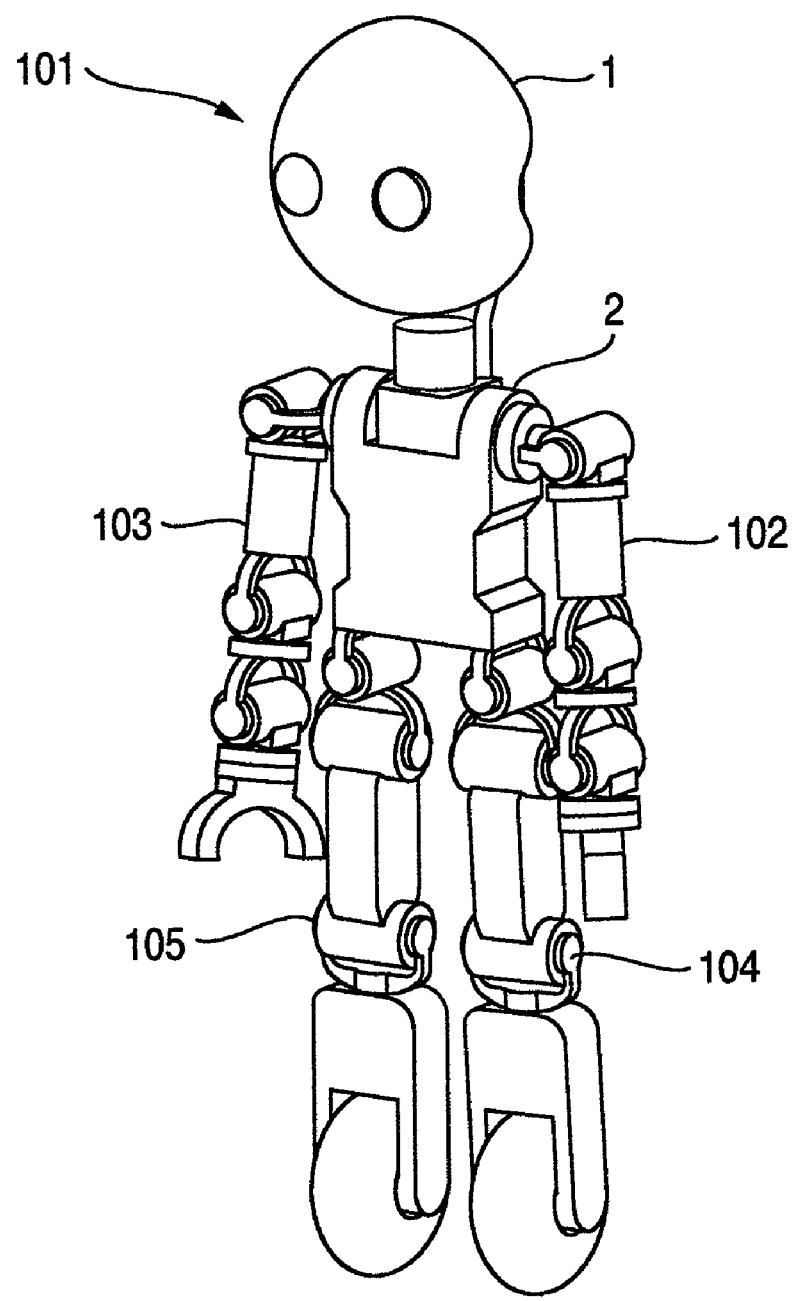
FIG. 1 is a view for explaining the whole of a robot according to an embodiment.
Figure 2:
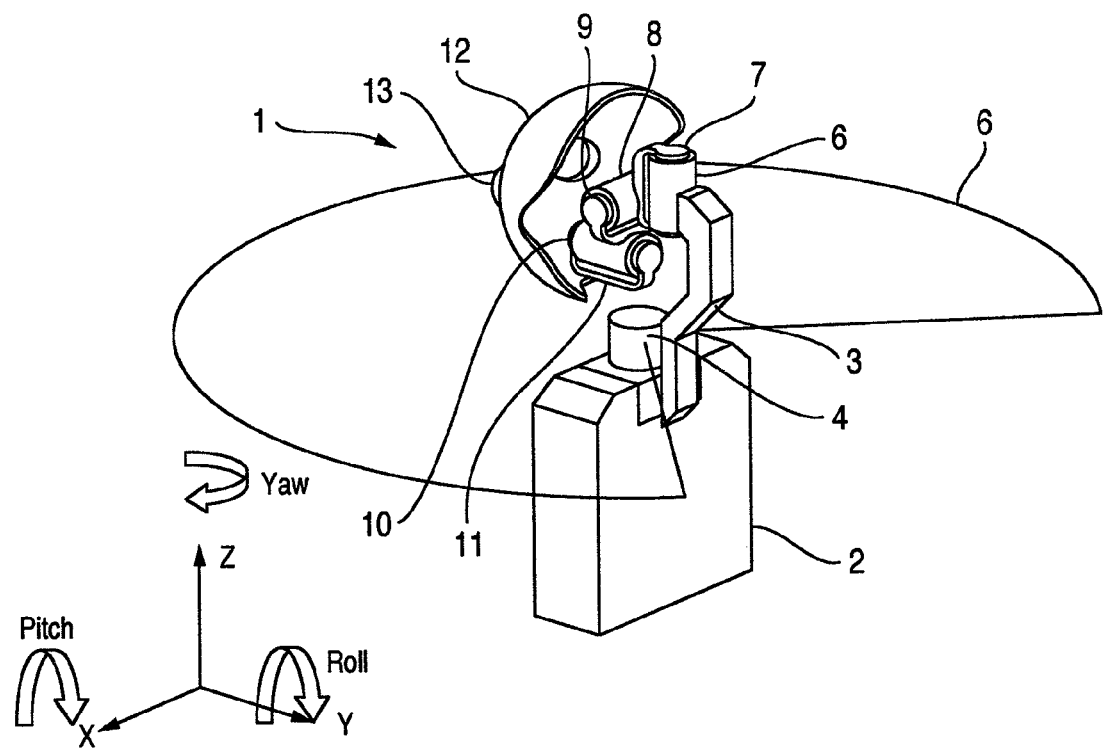
FIG. 2 is a view for explaining a head part of the robot according to the embodiment.
Figure 3:
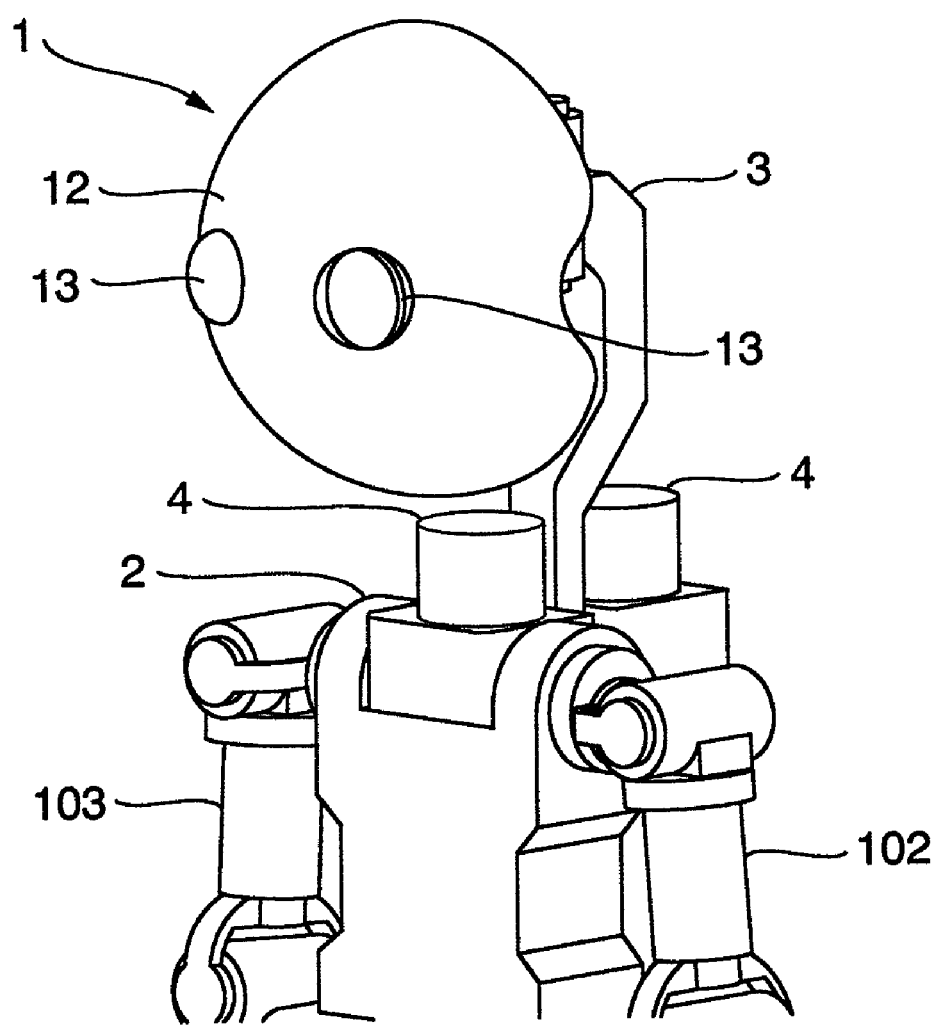
FIG. 3 is a view for explaining another configuration of the present invention.
Figure 4:
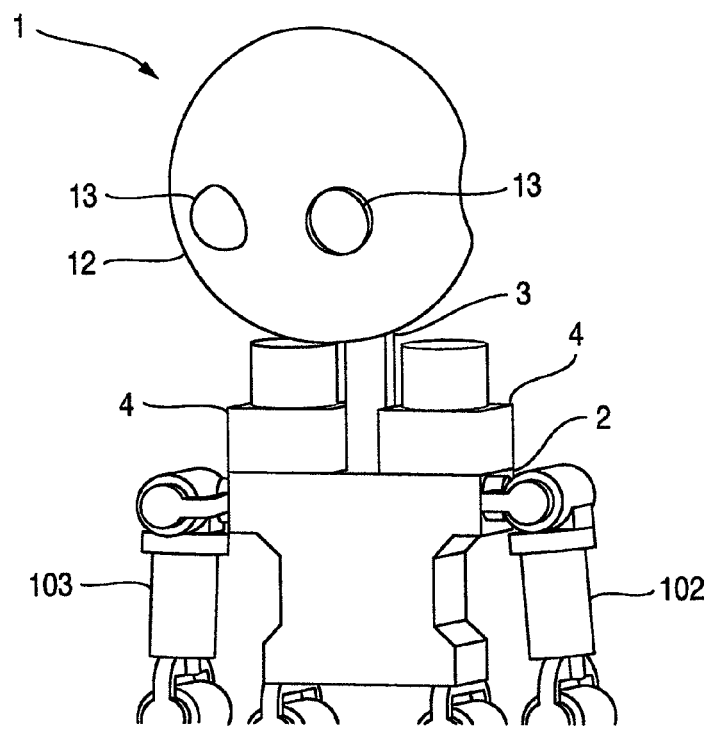
FIG. 4 is a view for explaining another configuration of the present invention.
Figure 5:
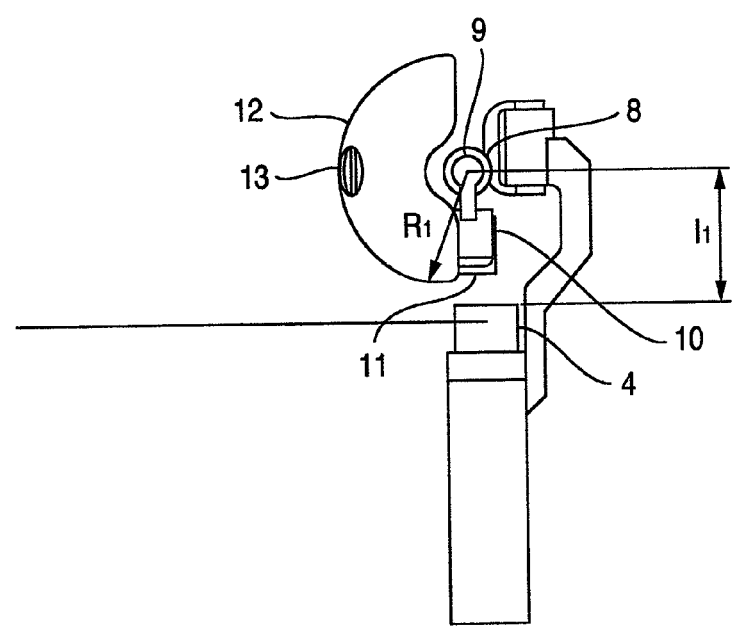
FIG. 5 is a view for explaining pitch axis movement of the head part of the robot.
Figure 6:
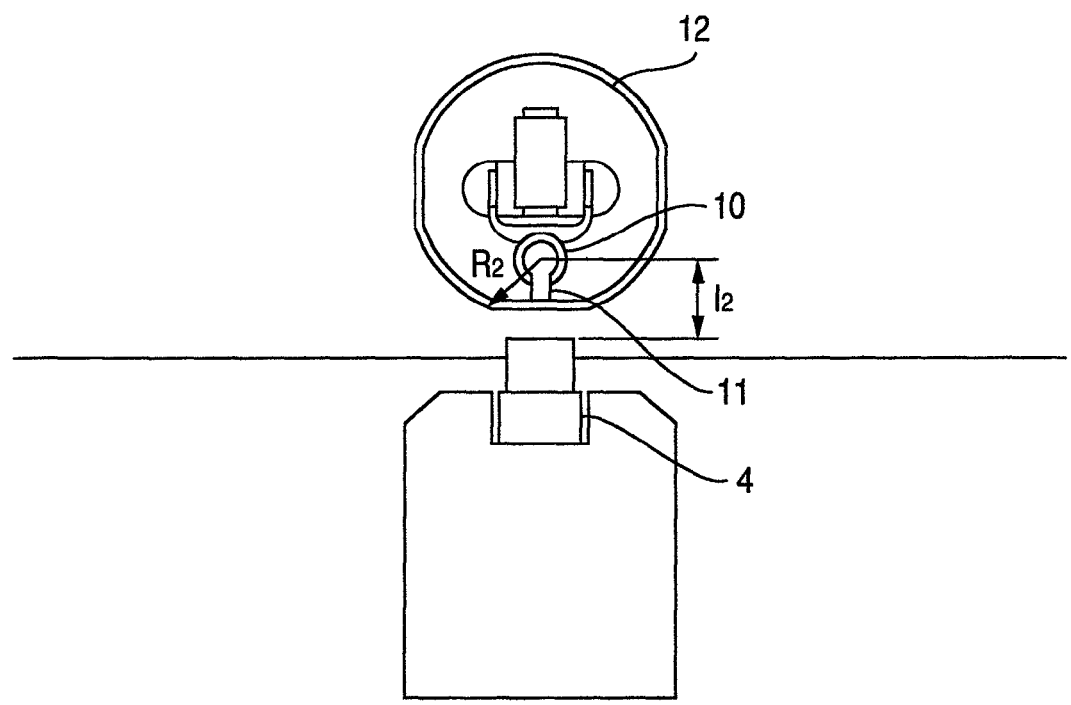
FIG. 6 is a view for explaining roll axis movement of the head part of the robot.

FIG. 1 is a view showing the whole of a robot of an embodiment, FIG. 2 is a view showing the whole of a head part of the robot of the embodiment, FIGS. 3 and 4 are views showing other configurations, FIG. 5 is a view for explaining movement of a pitch axis of the robot of the embodiment, and FIG. 6 is a view for explaining movement of a roll axis of the robot of the embodiment.

In the following embodiment, a surrounding object distance measurement means will be described using a laser scanning range sensor as an example. In addition, there is a humanoid robot as an example of a robot to which the present invention is applied, and the description is made using it as an example.

A robot 101 is composed of a head part 1, a body part 2, a left arm 102, a right arm 103, a left leg 104 and a right leg 105. For example, the left leg 104 and the right leg 105 are used for movement of the robot 101, and the left arm 102 and the right arm 103 are used for work, e.g. for grasping an object. In this embodiment, the head part 1 is located at the top of the robot 101, and is provided so as to be connected with the body part 2.

FIG. 2 shows the structure of the head part 1, and is a view showing a roll direction (an arrow "Roll"), a pitch direction (an arrow "Pitch"), and a yaw direction (an arrow "Yaw"). A first head actuator 6, a second head actuator 8, and a third head actuator 10 have power sources (motors), speed reducers, and angle detectors (rotary encoders or potentiometers) built-in, and drive a connected part.

The head part 1 consists of: a neck link 3 attached to an upper central portion of the body part 2 so that its longitudinal direction is parallel with the yaw direction; the first head actuator 6 attached to an opposite end in the longitudinal direction of the neck link 3 to connection with the body part 2 so that an output shaft is in parallel with the yaw direction; a first head link 7 oscillated over a predetermined angle only in the yaw direction by the output shaft of the first head actuator 6; the second head actuator 8 attached to the first head link 7 so that the direction of an output shaft is in the pitch direction; a second head link 9 oscillated over a predetermined angle only in the pitch direction by the output shaft of the second head actuator 8; a third head actuator 10 attached to the second head link 9 so that the direction of an output shaft is in the roll direction; a third head link 11 oscillated over a predetermined angle only in the roll direction by the output shaft of the third head actuator 10; a face 12 of the robot attached to one end facing forward in the longitudinal roll direction of the third head link 11; and eyes 13 of the robot attached to a design surface of the face 12 of the robot. However, the design surface of the face 12 of the robot does not necessarily require the eyes, but any outside appearance may be adopted as long as its design indicates the direction of the front of the robot. Here, a laser scanning range sensor 4 is provided adjacently to the neck link 3 which connects the head part 1 and the body part 2 and in the upper central portion of the body part 2 so that a laser scanning range sensor scanning plane 5 is provided in parallel with a horizontal plane, and the center of a scan field is parallel with the roll axis.

In FIG. 2, the state where the face 12 of the robot of the head part 1 faces in the front forward direction is set as a reference posture. The neck link 3 is disposed in a blind spot of the laser scanning range sensor scanning plane 5, and does not disturb the view of the laser scanning range sensor 4 at all. By constructing the head part 1 in this manner, the following advantages are brought about.

First, since the laser scanning range sensor 4 is attached not to the head part 1 which is moved by the three actuators, but to the body part 2, and therefore the loads of the first head actuator 6, the second head actuator 8 and the third head actuator 10 for moving the head part 1 become small, there is an effect that power-saving is obtained.

Second, since the laser scanning range sensor 4 is attached not to the head part 1 which is moved by the three actuators, but to the body part 2, there is an advantage that the laser scanning range sensor 4 can measure the distance from a surrounding obstacle or an object regardless of the posture of the head part 1.

Third, since laser scanning range sensor 4 is not disposed in head part 1, the degree of freedom of appearance design of the robot head part becomes large, so that natural appearance having an affinity to a human can be achieved.

Fourth, since the laser scanning range sensor 4 is disposed in a part corresponding to the neck part of the robot, there is an advantage that the laser scanning range sensor scanning plane 5 is rarely shielded during operation by the arms.

Further, in FIG. 2, one laser scanning range sensor 4 is arranged to face forward. However, in order to scan the whole field, two may be arranged on the front and rear sides as shown in FIG. 3, or two may be arranged on the right and left sides as shown in FIG. 4.

FIG. 5 is a view showing the head part 1 from the pitch axial direction. In FIG. 5, assuming that the distance between a top surface of the laser scanning range sensor 4 and the output shaft of the second head actuator 8 is $l_1$, and the distance between the most distant point from the output shaft of the second head actuator 8, among the second head link 9, the third head actuator 10, the third head link 11 and the face 12 of the robot which are integrally oscillated by the second head actuator 8, and the output shaft of the second head actuator 8 is $R_1$, the dimension of each element is decided to achieve $l_1 > R_1$, so that even if the second head actuator 8 is oscillated at a predetermined angle, the components of the head part do not become an obstacle of the laser scanning range sensor scanning plane 5.

FIG. 6 is a view showing the head part 1 from the roll axial direction rear, in which the neck link 3 is omitted to make it easy to see components of the head part 1. In FIG. 6, assuming that the distance between a top surface of the laser scanning range sensor 4 and the output shaft of the third head actuator 10 is $l_2$, and the distance between the most distant point from the output shaft of the third head actuator 10, between the third head link 11 and the face 12 of the robot which are integrally oscillated by the third head actuator 10, and the output shaft of the third head actuator 10 is $R_2$, the dimension of each component is decided to achieve $l_2 > R_2$, so that even if the third head actuator 10 is oscillated at a predetermined angle, the components of the head part do not become an obstacle of the laser scanning range sensor scanning plane.

In the above embodiment, although the case where the head part 1 has three degrees of freedom is explained, the invention is not limited thereto, but also applicable to the case of one of the yaw axis, the roll axis and the pitch axis, or the combination of the two among those.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A robot comprising a head part attached to an upper central portion of a body part via a neck link, and a head actuator for moving the head part, wherein
    a laser scanning range sensor is provided adjacently to the neck link and in the center of a top of the body part, a scanning plane of the laser scanning range sensor being in parallel with a horizontal plane, and
    a distance $l_1$ between a top surface of the laser scanning range sensor and an output shaft of the head actuator, and a distance $R_1$ between the output shaft of the head actuator and the most distant point of a face constituting the head part from the output shaft of the head actuator are set to satisfy the relationship of $l_1 > R_1$.

2. The robot according to claim 1, comprising two said laser scanning range sensors arranged in the center of the top of the body part.

* * * * *